United States Patent [19]

Bower

[11] Patent Number: 4,744,416

[45] Date of Patent: May 17, 1988

[54] DIRECTIONAL ACOUSTIC LOGGER APPARATUS AND METHOD

[75] Inventor: Frank M. Bower, Edmond, Okla.

[73] Assignee: Exxon Production Research Company, Houston, Tex.

[21] Appl. No.: 80,132

[22] Filed: Jul. 31, 1987

Related U.S. Application Data

[62] Division of Ser. No. 677,776, Dec. 3, 1984, Pat. No. 4,703,459.

[51] Int. Cl.⁴ .................. E21B 33/13; E21B 43/19; E21B 47/10
[52] U.S. Cl. ................... 166/253; 166/55.1; 166/66; 166/285; 166/297
[58] Field of Search .............. 166/55.1, 66, 253, 285, 166/297, 241; 175/4.51; 181/104; 367/25

[56] References Cited

U.S. PATENT DOCUMENTS

| | | | |
|---|---|---|---|
| 2,210,417 | 8/1940 | Kinley | 73/40.5 A |
| 2,361,458 | 10/1944 | Converse | 367/35 |
| 2,396,935 | 3/1946 | Walstrom | 181/102 |
| 2,718,929 | 9/1955 | Weiss | 367/37 |
| 2,783,449 | 2/1957 | Loofbourrow | 367/181 |
| 2,830,283 | 4/1958 | Massa | 367/141 |
| 2,849,075 | 8/1958 | Godbey | 367/25 |
| 2,959,240 | 11/1960 | Schmuck | 181/104 |
| 3,593,255 | 7/1971 | White | 367/25 |
| 3,704,749 | 12/1972 | Estes et al. | 175/4.51 X |
| 3,745,822 | 7/1973 | Pierce et al. | 73/154 |
| 3,836,951 | 9/1974 | Geren et al. | 367/125 |
| 3,838,593 | 10/1974 | Thompson | 367/120 X |
| 3,854,117 | 12/1974 | Fothergill | 367/125 |
| 3,931,607 | 1/1976 | Ingram | 367/125 |
| 3,991,850 | 11/1976 | Escaron | 181/102 |
| 4,046,220 | 9/1977 | Glenn, Jr. | 181/105 |
| 4,074,756 | 2/1978 | Cooke, Jr. | 166/253 |
| 4,078,222 | 3/1978 | Woodruff | 367/125 |
| 4,109,717 | 8/1978 | Cooke, Jr. | 166/250 |
| 4,114,721 | 9/1978 | Glenn, Jr. | 181/105 |
| 4,531,583 | 7/1985 | Revett | 166/253 |

Primary Examiner—George A. Suchfield
Attorney, Agent, or Firm—Karen T. Burleson

[57] ABSTRACT

An acoustic logging apparatus and method are disclosed for determining the direction of a subsurface noise source, such as a blowout well or fluid channeling behind well casing. The apparatus comprises cylindrical piezoelectric crystal transducers processed to buck each other. The method employs such an apparatus and includes generating and observing output from the crystals. The direction of the noise relative to the position of the apparatus is indicated by determining the position of the crystal transducers when their phase and amplitude differences are at a minimum. The transducer leading in phase at a point perpendicular to said position is the transducer closest to the noise source and is used to indicate the absolute direction of the noise.

4 Claims, 3 Drawing Sheets

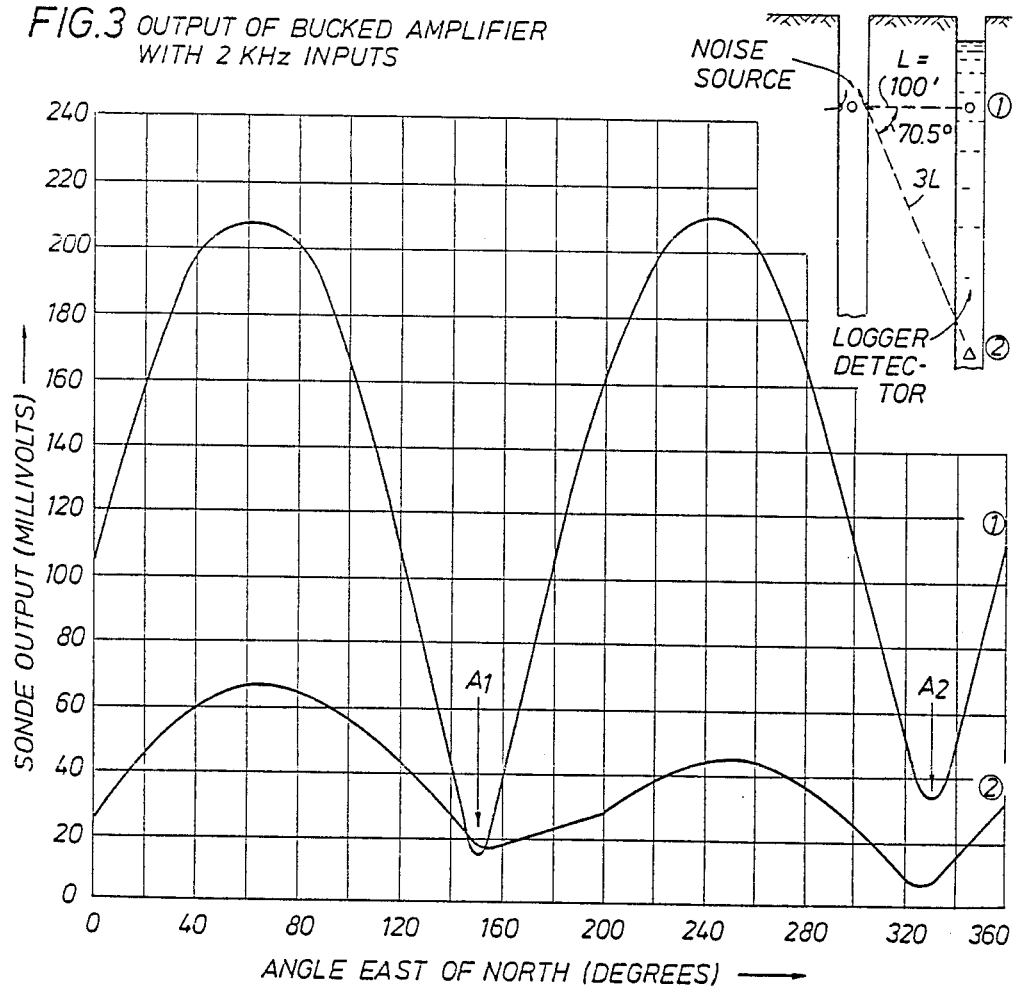
FIG. 3 OUTPUT OF BUCKED AMPLIFIER WITH 2 KHz INPUTS
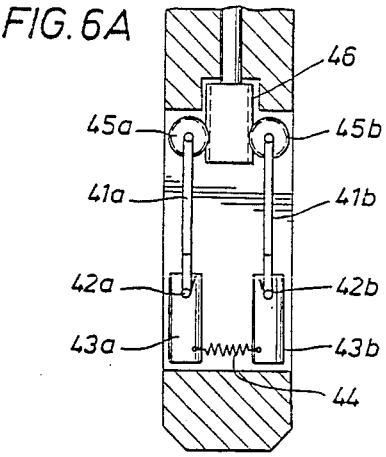
FIG. 6A
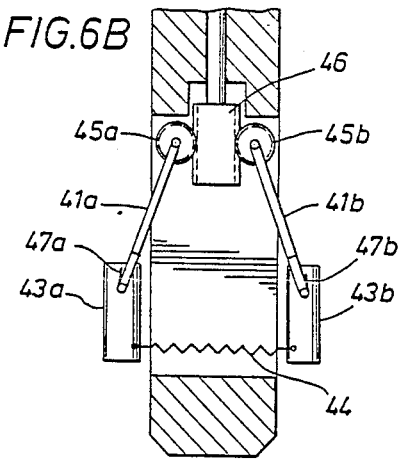
FIG. 6B

DIRECTIONAL ACOUSTIC LOGGER APPARATUS AND METHOD

This application is a division of co-pending application Ser. No. 677,776, filed Dec. 3, 1984, now U.S. Pat. No. 4,703,459.

FIELD OF THE INVENTION

This invention relates to a directionally sensitive noise logging apparatus and method particularly useful in operations related to oil and gas wells.

BACKGROUND OF THE INVENTION

The practice of acoustical well logging is well known in the oil and gas industry. One particular use of acoustic logging is to determine the points at which fluid or gas are entering or leaving the bore of a well. This information is particularly valuable when fluid or gas is entering or leaving the well through a leak in the casing. These casing leaks must often be plugged to assure proper well operations. Acoustic logging is also useful in determining whether or not there is channeling between different producing formations in a well.

One apparatus for locating leaks in casings and boreholes is disclosed in U.S. Pat. No. 2,210,414, issued Aug. 6, 1940 to Kinley. Kinley discloses a sound detector suspended from a cable so that it may be lowered into and withdrawn from a borehole. The detector comprises a sound detecting mechanism, such as a microphone, which responds to sound produced by the leaking liquid.

Another apparatus for determining the location of fluid entering or exiting a well is disclosed in U.S. Pat. No. 2,361,458 issued on Oct. 31, 1944 to Converse. This patent discloses an acoustic device having a sharp response to horizontal signals. Because of this response characteristic, the apparatus may be used to very precisely determine the points of entrance of fluid into a borehole. The apparatus is characterized as being sensitive to noises originating adjacent to the apparatus, while the effect of other noises in the same acoustical range, but vertically removed from the apparatus, is substantially eliminated.

Although devices for determining the location of a leak in a well such as those described above are well known, such devices are generally directionally insensitive. These devices identify only the depth at which the noise associated with the leak is being produced, not the direction from which the noise is coming. Information as to the direction in which a subsurface noise source is located can be very useful in oil and gas well operations.

One such use for directional noise information is in blowout relief well operations. One method of correcting a blowout is to drill relief wells to the vicinity of the well in the formation which is producing fluids or gas into a blowout. Determining the location of such production and drilling a relief well with the required accuracy are difficult tasks. One common technique relies on detecting aberrations in the propagation of magnetic waves in the earth. Such aberrations may be caused by the well casing of a blowout well. Another common technique detects resistivity differences between a blowout well casing and the earth. Such techniques can often be difficult to apply and in any event are of little use when a blowout occurs below the well casing or occurs in a well having no well casing.

Directional information is also useful in operations involving wells where channeling is occurring between different formations. Channeling involves the flow of fluids behind the well casing. Channeling may involve the leakage of fluid or gas from a producing to a non-producing formation, or the leakage of non-hydrocarbons into a producing formation. Such leakage may result in an eventual decrease in production from the well. One method of correcting such leaks is to perforate the well casing and force cement into the undesired channel, thus blocking the flow of fluid or gas through the channel. Although the depth at which the perforation should be made may be determined using conventional noise logging techniques, the proper circumferential location in which to perforate the casing is difficult to determine.

There continues to be a need in the oil and gas industry for improved apparatus and methods for determining the direction of a subsurface noise source.

SUMMARY OF THE INVENTION

The directional noise logging apparatus of the present invention includes two cylindrical piezoelectric crystals having outputs which are electrically processed so that the crystals buck each other. That is, the output of the crystals are electrically processed so as to oppose one another. These crystals, which are well known in the art, convert sound energy into electrical energy. The output of each crystal is a signal whose voltage is proportional to the strength of the sound energy impinging on the crystal.

For operation, the crystals are positioned substantially side by side without touching and with their cylindrical axes substantially parallel to each other. They are held in this position by epoxy, support arms or other means of rigid support. The crystals and their support are adapted for lowering into a borehole by attachment to or inclusion in a logging assembly on a wireline.

In practicing the method of the present invention, the relative direction of an underground noise source may be determined by lowering on a wireline into a borehole a logging assembly including a directional acoustic logging apparatus having two crystals electrically processed to buck each other. These crystal transducers are positioned with respect to each other in the apparatus so that they are side by side with their cylindrical axes substantially parallel. At the desired depth, the apparatus is rotated through 360 degrees and the crystal transducers generate output which is used to determine the relative direction of the noise source. When the desired depth is substantially on the horizontal plane on which the noise source also substantially lies, the noise source will lie on a line substantially perpendicular to that line which may be drawn through the centers of both transducers when their phase and amplitude output is at a minimum. The direction of the noise source on this line may be determined by observing which transducer is leading in phase when the transducers are positioned so that a line may be drawn through both their centers and through the noise source. Such transducer leading in phase will be the one closest to the noise source.

In practicing one application of the method of the present invention, the directional acoustic logging apparatus is lowered into the well, along with an absolute directional indicator such as a gyroscope or magnetometer. Once at the desired depth, the directional acoustic logging apparatus and absolute directional indicator are rotated through 360 degrees. During this revolution, both the directional acoustic logging apparatus and absolute directional indicator generate output which is observed and preferably transmitted to recording devices preferably on the surface. Preferably, both the phase and amplitude of each crystal response of the apparatus of the present invention are recorded. These phase and amplitude measurements may be used to determine the direction of the source of the noise which resulted in those measurements relative to the position of the apparatus when the measurements were taken. These measurements may then be correlated with the indications from the absolute directional indicator to determine the absolute direction in which the noise source is located.

In practicing another application of the method of the present invention, particularly an application for channel repair, the absolute directional indicator is replaced by a perforating gun with zero phased shots, i.e., with shots aligned along the axis of the gun so that all the shots are facing in the same direction. The gun is associated with the crystals such that one crystal is aligned with the shots of the gun. This orients the shots to the noise direction when the gun is discharged.

BRIEF DESCRIPTION OF THE DRAWINGS

FIG. 3 represents a typical plot of amplitude signals from the directional noise logger of the present invention.

FIGS. 6a and 6b show an alternate embodiment of the directional noise logger of the present invention.

DETAILED DESCRIPTION OF THE INVENTION

I have found a logging apparatus and method for determining the direction from which a subsurface noise, such as the flow of fluid or gas through a channel, emanates. Such flow may be due, for example, to channeling of fluids behind a well casing or to leaks in the casing through which fluid enters or leaves a well. The subsurface noise may also be due to a blowout in a well. An advantage of this invention is that it can be used to determine the direction of the noise whether the noise is adjacent to the borehole in which the apparatus of the invention is employed or is some distance away, for example, as much as 100 feet or more. Such determination is related to the noise itself and is not dependent on the presence near the noise source of well casings or well tools which may be detected with magnetic or resistivity techniques.

Application of this invention allows the point of fluid channeling or leaking to be easily and accurately detected so that effective measures may be taken to stop such channeling or leaking. For example, directional noise measurements made or taken with this invention can provide the information needed to properly orient perforations into a casing at a point of fluid channeling so the channels can be plugged. Application of this invention also allows the direction from which a source of production is coming into a blowout to be determined from a relief well. The relief well can then be more accurately drilled to a satisfactory location near that source.

Figure 1:
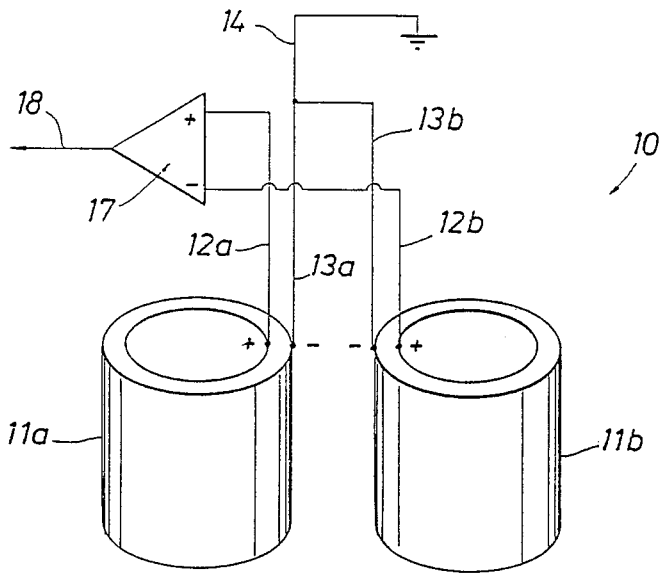
FIG. 1 illustrates the arrangement of the piezoelectric crystal transducers of the present invention.

The apparatus of the present invention as depicted in FIG. 1, directional acoustic logger 10, comprises two cylindrical piezoelectric crystal detection transducers 11a and 11b. These elements operate on the well-known principle that certain crystals produce a surface potential difference, or voltage, when they are stressed in appropriate directions. Cylindrical piezoelectric crystals, or crystal transducers as they may also be called, are commonly used in borehold acoustic detection apparatus.

It is desirable in practicing this invention that the crystals be spaced as far apart as possible and still be able to fit in a borehold without being so close to the side of the hole as to result in signal interference from extraneous acoustic paths.

In the preferred embodiment of directional acoustic logger 10, the two transducers 11a and 11b are spaced so that the cylindrical axes of the two transducers are about six and one-half centimeters apart. With this spacing the apparatus will function properly in response to acoustic waves having frequencies as low as 1000 Hz and probably somewhat lower, while still providing a device compact enough to be used in boreholes of relatively small diameter, for example, 8 inches. Transducers 11a and 11b may be encapsulated in an epoxy block (not shown) so as to maintain the desired spacing. It is preferable that the epoxy selected have a high sonic velocity of approximately 5000 ft./sec. so that the phase differential measurements which are discussed below will be independent of influence from the presence of fluid in the borehole. At this velocity, the maximum phase differential is that corresponding to about 50 microseconds lag time. If an epoxy block is not used, other support should be used to hold the crystals in place. The crystals and their support may be referred to as a transducer assembly 28.

Transducers 11a and 11b are each about one-half inch in diameter and one inch in length. The size of the transducer is not, however, particularly significant and any practicable size for fitting into a borehole may be used. The transducers are, however, preferably the same size and do not touch each other when their output is being observed.

The output from transducers 11a and 11b are electrically processed so as to preferably preserve the true phase and amplitude of each output. The signals are further processed so as to determine the phase difference between the signals. This processing can be done in numerous ways known to those skilled in the art of electronics. A novelty of this invention lies in the significance of those two angular positions at which the transducer signals are in phase. This significance is explained below with reference to the simplest procedure for detecting these in-phase locations.

The transducers 11a and 11b are connected so as to "buck" each other. In the simplest arrangement, for example, this bucking may be achieved by connecting the positive output terminal of the first crystal to the negative output terminal of the second crystal. However, in the practice of this invention, it is preferable that phase and amplitude output of each transducer be preserved. Thus, processing beyond the simplest arrangement is usually desirable. For example, as shown in FIG. 1, positive output lead 12a of transducer 11a is electrically connected to the positive input of an operational amplifier 17 while the positive output lead 12b of transducer 11b is electrically connected to the negative input of the same amplifier 17. The output from the amplifier 17 is fed to measurement and recording means (not shown) over wire 18. Negative output leads 13a and 13b from transducers 11a and 11b respectively are connected to lead 14 which is a ground for the system. The significance of processing the transducers in such a manner will be discussed below.

Figure 2:
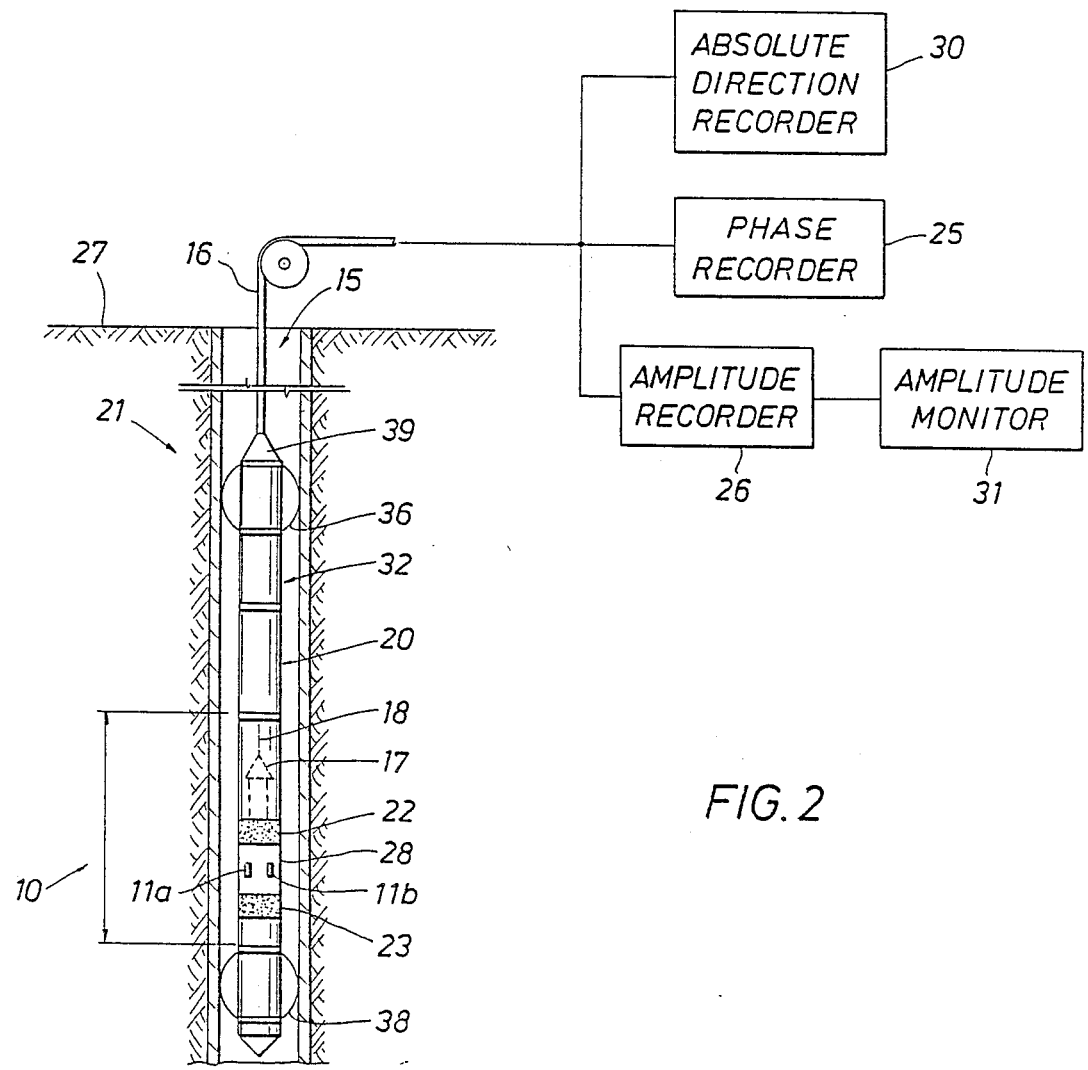
FIG. 2 illustrates the use of the apparatus of the present invention in a borehole.

FIG. 2 depicts the directional logger of the present invention as it may be used in operation. The logger 10 will be positioned in or attached to a conventional logging assembly 21 and lowered into borehole 15 on electric wire line 16. Preferably blocks of acoustic isolating epoxy 22 and 23 or epoxy containing lead will be above and below the transducer assembly 28 in the logging assembly 21 to prevent interference from extraneous noise. A device which provides an indication of absolute direction 20, such as a magnetometer or gyroscope, is in this particular application depicted also positioned in the logging assembly 21 and associated to the transducers of the logger 10 in such a way that the position of the transducers with respect to the absolute direction indicator 20 is known. Absolute direction indicator 20 will provide an indication of absolute direction during operation of logger 10. The signals from logger 10 are transmitted by means of electric wire line 16 to phase recorder 25 and amplitude recorder 26 located at the surface 27. The output signal from absolute direction indicator 20 is transmitted over electric wire line 16 to absolute direction recorder 30. Although the recorders 25, 26 and 30 are located at the surface 27, they could also be located in the borehole nearer the logger 10. A surface location for the recorders, however, is generally considered more convenient.

One use or example operation of directional acoustic logger 10 is in the determination of the direction of a noisy blowout from a remote relief well. It is desirable to be able to determine the direction of the blowout from the relief well so that the relief well may be directionally drilled to the proper location to kill the blowout. Referring again to FIG. 2, in practicing the method of the present invention, directional logger 10 is lowered into borehole 15, the relief well, on electric wire line 16 to each measurement station. At each stop, the output of each crystal transducer is monitored on amplitude monitor 31 on the surface 27 to determine the depth at which the peak noise amplitude occurs. The logger is then moved to that depth where its vertical movement is stopped. At that depth, the output from the operational amplifier bucking the transducers is introduced to the amplitude recorder 26, and the logger 10 and the absolute direction indicator 20 are rotated 360 degrees through the horizontal plane using a conventional downhole rotator. Such rotator may be, for example, as depicted in FIG. 2, a barrel with rotation motor 32 on a conventional logging assembly 21 with centralizing bow springs 36 and 38. Electrical connections for operating the rotation motor may be contained in the cable head 39. Both the amplitude of the bucked signal and the phase of the individual signal from transducers 11a and 11b are recorded on recorders 25 and 26 at the surface during the 360 degree rotation. The corresponding signal from absolute direction indicator 20 is also recorded at the surface.

FIG. 3 shows actual example output of a bucked amplifier with 2 KHz inputs from the logger of this invention located in a second well, such as a relief well, drilled 100 feet from the well containing the noise source, such as a blowout. In this example, only amplitude for the logger at two different vertical locations in the well is shown. While phase is not shown, such output would be similar, with two points at a zero baseline corresponding to $A_1$, and $A_2$. However phase would appear as a sine curve. FIG. 3 shows that stronger output is seen when the logger is directly across or on the same horizontal line or plane as the noise source, that is, at position 1. The fact that the logger is effective at this distance of 100 feet is significant since directional loggers commonly used in the industry are not generally effective at this great a distance and accurate noise direction detection at such a distance is often needed and can be very useful.

The recorded amplitude signal output of the bucked transducers, as illustrated by FIG. 3, will typically be found to have two maximums or high points ideally 180 degrees apart, and two minimums or low points also ideally 180 degrees apart. Because resonance in the borehole may result in the maximums of the output signals being extremely distorted, the signal minimums are used in making the actual determination of the direction of the source of the noise. These minimums, identified by $A_1$ and $A_2$ in FIG. 3, can be precisely determined by precise phase detection instrumentation well known to those in the field of electronics.

Figure 4A:
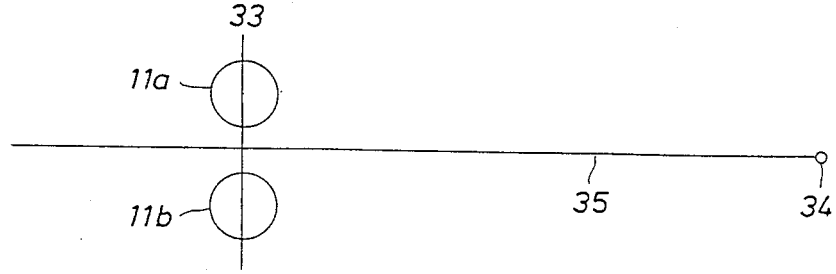
FIGS. 4a and 4b illustrate the relationship of a subsurface noise source to the crystal transducers of the present invention.

Because the output signals of the two individual transducers of the directional logger are connected so as to buck each other, the minimum amplitude and phase difference signals as recorded at the surface will occur when, as shown in FIG. 4A, the transducers 11a and 11b are oriented so that a line 33 drawn through the centers of the two transducers is substantially perpendicular to the direction of the noise source 34 being detected. In this alignment, the acoustic signals received by the two transducers are in phase, and as such, the transducer outputs are in phase. Since the transducer outputs are connected in a bucking configuration, the individual transducer outputs will tend to cancel each other. Thus, both the amplitude and phase recorders will indicate a minimum in this alignment. These minimums are then correlated with the corresponding point on the absolute direction recording. A perpendicular line 35 may then be plotted in the absolute direction associated with the two low points. The noise source being detected by the directional logger lies generally on this line 35.

Resonance due to borehole irregularity may cause the minimums, $A_1$ and $A_2$, FIG. 3, to be separated by more or less than 180°. An equal correction to each location so as to make the separation exactly 180° leads to the correct orientation of the direction line 35.

Figure 4B:
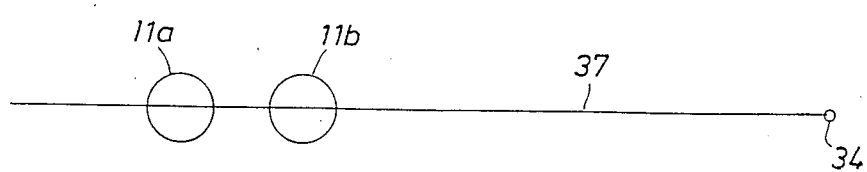

Having determined the line on which the noise source lies, the phase difference with the transducer axis aligned on that line may be used to determine in which direction on that line the noise source is located. Referring to FIG. 4B, when the two transducers 11a and 11b of the directional logger are aligned so that a line 37 drawn through the centers of the two transducers will pass through the source 34 of the noise being detected, the acoustic signal being received by transducer 11b nearest the noise source will be out of phase with the acoustic signal being received by transducer 11a farthest from the noise source. Because the acoustic signal first impinges on the transducer closest to the source of the noise, the direction of the noise source from the logger on line 37 may be determined by determining which transducer's output is leading in phase. The phase record is used to determine which transducer's output is leading in phase. This phase difference is not necessarily the maximum value recorded during the 360° rotation due to interference from borehole irregularity. Thus, in practicing this method of the present invention, the line on which the noise source is located is first determined by locating a line which corresponds to the low points of the amplitude and phase output signals of the logger. In FIG. 4A, this line is line 33. The direction line (line 35 in FIG. 4A) is oriented 90° to the minima axis (line 33 in FIG. 4A). The direction of the noise source on that line is then found by determining which of the two transducers' outputs is leading in phase.

Figure 5:
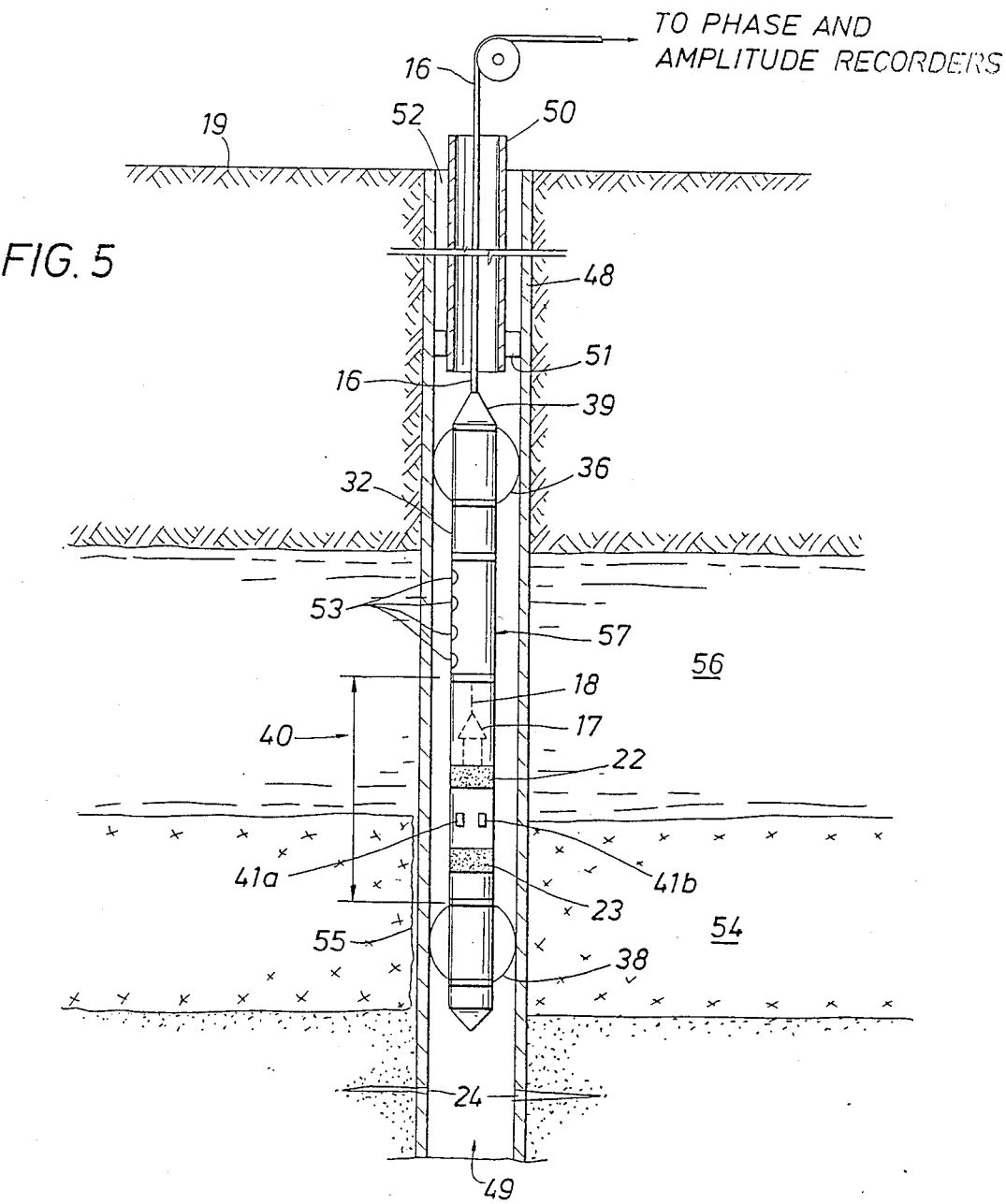
FIG. 5 illustrates the use of the apparatus of the present invention in operations to stop leakage between formations behind the casing of a well.

The directional logger may also be used in operations required when fluid or gas from one formation is traveling behind the casing to another formation. Referring to FIG. 5, directional logger 40 is shown in well 49. As shown, well 49 is producing hydrocarbons from formation 54. The hydrocarbons flow into well 49 through perforations 24 in casing 48. The hydrocarbons flow to the surface 19 through production tubing 50. Packer 51 prevents the hydrocarbons from flowing in the annulus 52 between production tubing 50 in casing 48.

A channel 55 is shown on the outside of casing 48 between formation 54 and formation 56. As is generally the case, the channel does not completely surround the casing. Fluid or gas will leak through channel 55 from the formation having the higher formation pressure to the formation having a lower formation pressure.

One method of stopping such leakage is to perforate casing 48 on the side of the casing where the leakage is occurring and force cement through the perforation in the casing into the channel, thus blocking the path of the leaking fluid. One problem in carrying out such operations is the difficulty in determining the direction in which the perforating device should be pointed so that the perforations are made on the side of the casing behind which the channel has formed. Referring again to FIG. 5, directional logger 40, perforating gun 57 with zero phasing, and downhole rotator barrel with rotation motor 32 are supported in well 49 from electric wire line 16 for use in operations to determine on which side of the casing the channeling has occurred.

As indicated above in the description of the preferred embodiment of the noise logger, the two transducers are preferably spaced so that the cylindrical axes of the two transducers 11a and 11b are about six and one-half centimeters apart. Production tubing 50, however, may be too narrow to allow a directional logger having transducers so spaced to pass readily therethrough. As such, an alternate embodiment of the directional logger is used when the logger must be lowered through narrow production tubing. As shown in FIG. 6A, transducers 43a and 43b of directional logger 40 are pivotally mounted to arms 41a, and 41b respectively at pins 42a and 42b. The mechanical operation of directional logger 40 is similar to the operation of the temperature sensor assembly disclosed in U.S. Pat. No. 3,745,822, issued July 17, 1973 to Pierce et al., the entirety of which is incorporated herein by reference.

Arms 41a and 41b are attached to toothed cams 45a and 45b. These toothed cams rotate when rack 46 is moved vertically. When the logger is to be lowered though the production tubing, the cams, rack, and transducers are in the position shown in FIG. 6A. The transducers are extended to their operating position in the same manner as the probes of the temperature sensor assembly disclosed in Pierce are extended. Rack 46 is moved downward within the tool. The operating mechanism for rack 46 is not shown in FIG. 6A, and may be similar to that disclosed by Pierce or any other known system for operating such a mechanism in a borehole environment. As rack 46 moves downward, cams 45a and 45b rotate to move arms 41a and 41b outward. The limit of rack travel is preset so that at the end of its travel, the arms will have pivoted so that the center-to-center spacing between cylindrical transducers 43a and 43b, as measured at pins 42a and 42b, is about six and one-half centimeters. As shown in FIG. 6B, spring 44 acts in combination with mechanical stops 47a and 47b to bring the transducers into parallel alignment. The stops are positioned so that spring 44 can pivot the bottom of the two transducers about pins 42a and 42b no further than is required for such parallel alignment.

Returning to FIG. 5, in operations to block leakage channel 55, logger 40 is lowered through production tubing 50 with transducers 43a and 43b withdrawn. When logger 40 has passed below the production tubing into the area bounded only by casing 48, transducers 43a and 43b are extended to their operating position. Noise logging operations like those described above are performed to locate the direction from which the noise of the leakage through the channel is coming. However, for this application, no absolute orientation measurement is required. Instead the logger 40 may be attached to or associated with the perforating gun so that when extended, as in FIG. 6B, a designated transducer, say 43a in FIG. 6B, is aligned with the shots 53 on the perforating gun 57. After the orientation of the minima axis is determined, then a rotation of either plus 90° or minus 90° will cause the signal from transducer 43a to lead the signal from 43b. In this position, transducer 43a is pointed toward the channel 55 of FIG. 5, thereby orienting the perforation shots 53 toward channel 55.

It will be apparent that various changes may be made in the details of construction of the apparatus and the details of the performance of the methods from those shown in the attached drawings and discussed in conjunction therewith without departing from the spirit and scope of this invention as defined in the appended claims. It is therefore to be understood that this invention is not to be limited to the specific details shown and described.

What I claim is:

1. A method of stopping channeling of reservoir fluids from a hydrocarbon producing formation to a non-hydrocarbon producing formation behind casing of a well penetrating said formation comprising:
    (a) lowering on an electric wire line to a desired depth into said well a logging assembly having:
        a directional noise logging apparatus comprising two cylindrical piezoelectric crystal transducers, electrically processed so as to buck each other, supported on arms which may be moved outward by rotatable cams connected to a moveable rack attached to said logging assembly so that, before entering said well, said transducers may be positioned together so as to move easily through any production tubing that may be in the well, and at said desired depth, said transducers may be moved to a position such that they are about six and one-half centimeters apart, side by side, with their cylindrical axes substantially parallel to each other and to said well, a perforating gun with zero phase shots connected to said logging apparatus such that said perforating gun is aligned with one of the transducers of the apparatus, and a downhole rotator for rotating said logging apparatus and perforating gun;

(b) generating an output from said transducers;

(c) rotating said logging apparatus through 360 degrees at said desired depth;

(d) determining orientation of the transducers when their amplitude and phase difference signals are at their minimum;

(e) rotating the transducers 90° in the direction that the transducer aligned with the perforating gun produces a phase signal leading that produced by the other transducer and thereby orienting the perforation shots toward the noise source which is caused by the channeling of reservoir fluids behind well casing;

(f) perforating said casing at said noise source with said perforating gun; and (g) injecting into said non-producing formation through said perforation a material or fluid to block said channeling of reservoir fluids from said hydrocarbon producing formation.

2. The method of claim 1 wherein said desired depth is to the level in the well at which the channeling is occurring.

3. The method of claim 1 wherein said desired depth for lowering said logging apparatus into said well is that at which the peak amplitude noise output from said apparatus occurs.

4. The method of claim 2 wherein said perforating gun is lowered into said well to about the same level as said directional noise logging apparatus is lowered.

* * * * *